United States Patent [19]

Kimura et al.

[11] Patent Number: 4,689,639

[45] Date of Patent: Aug. 25, 1987

[54] INKED FILM FEEDING FOR A THERMAL PRINTER

[75] Inventors: Nobuhiro Kimura; Norikazu Sato; Yutaka Takagi; Tomoharu Sugano, all of Yamagata, Japan

[73] Assignee: NEC Corporation, Tokyo, Japan

[21] Appl. No.: 736,889

[22] Filed: May 22, 1985

[30] Foreign Application Priority Data

May 22, 1984 [JP] Japan ............................... 59-101810
May 22, 1984 [JP] Japan ............................... 59-101811
May 22, 1984 [JP] Japan ............................. 59-75087[U]

[51] Int. Cl.$^4$ ............................................. G01D 15/10
[52] U.S. Cl. ............................... 346/76 PH; 346/105; 400/356
[58] Field of Search .................. 346/76 PH, 145, 136, 346/105; 400/120, 356, 231; 219/216 PH

[56] References Cited

U.S. PATENT DOCUMENTS 4,527,172 7/1985 Nagashima et al. ........... 346/76 PH

*Primary Examiner*—Arthur G. Evans
*Attorney, Agent, or Firm*—Sughrue, Mion, Zinn, Macpeak, and Seas

[57] ABSTRACT

A thermal printer for transferring ink from an inked film onto paper using a thermal head includes an inked film feeding mechanism for feeding the inked film, a paper feeding mechanism for feeding the paper, and a platen located opposite the thermal head. For printing the thermal head is brought to the platen with a paper positioned between the thermal head and the platen by the paper feeding mechanism. A release mechanism for releasing the thermal head from the platen is provided. Also provided is a control apparatus which responds to the activation of the release mechanism to disable the film feeding mechanism, thereby stopping the feeding of the inked film at the time the thermal head is released from the platen. The control apparatus also operates to enable the paper feeding mechanism to feed the paper between the thermal head and platen when the thermal head is released from the platen. With this apparatus, the inked film is not fed by the film feeding mechanism while the paper is being fed between the thermal head and the platen.

7 Claims, 22 Drawing Figures

FIG 15
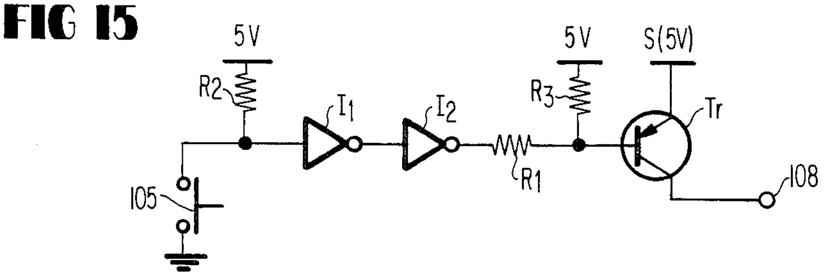
FIG 16
| A (mm) | CONNECTION | SW |
|---|---|---|
| 0~3 | ON | ON |
| 4~9 | ON | OFF |
| 10~ | OFF | OFF |
FIG 17
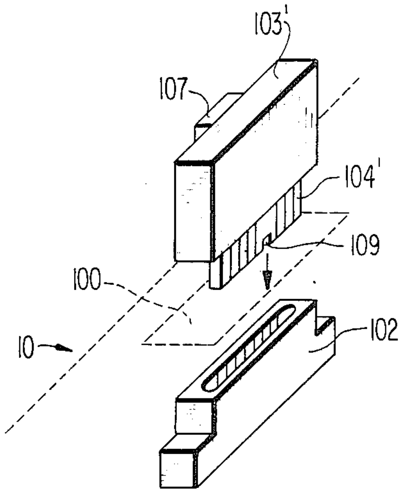

FIG 18
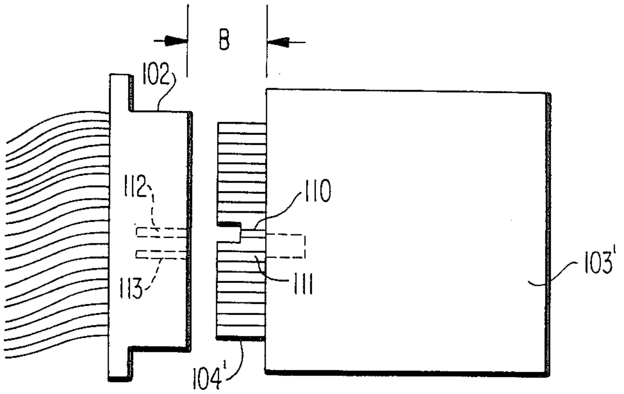
FIG 19
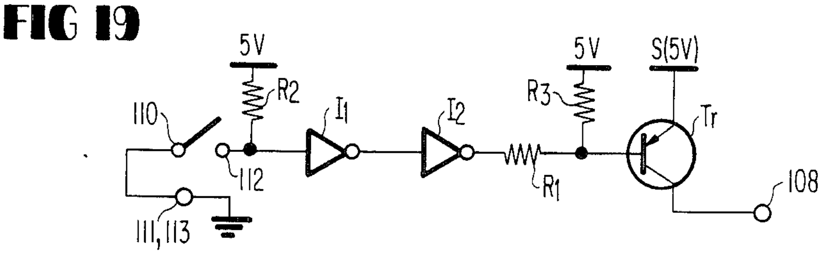
FIG 20
| B(mm) | CONNECTION | SW |
|---|---|---|
| 0 ~ 4 | ON | ON |
| 5 ~ 9 | ON | OFF |
| 10 ~ | OFF | OFF |
FIG 21
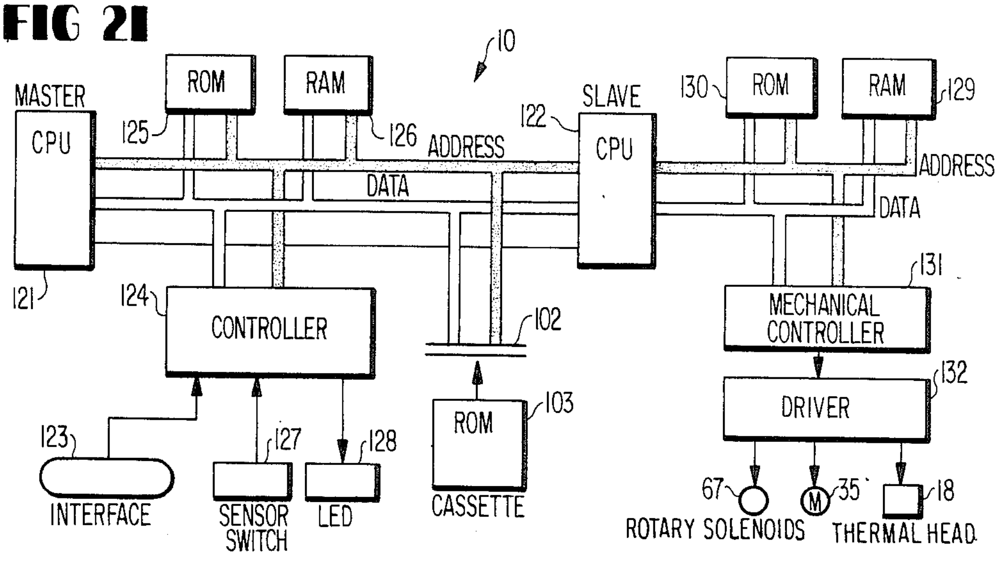

INKED FILM FEEDING FOR A THERMAL PRINTER

BACKGROUND OF THE INVENTION

The present invention relates to a thermal printer for printing an image or characters on a print paper by transferring ink of an ink film through heating. Generally, the ink film includes a base film on which an ink layer of several microns thick is formed.

A conventional thermal printer of this kind comprises a thermal head having a plurality of heating elements and a platen opposite to the head. An inked film and print paper piled on the inked film are inserted between the thermal head and the platen together. Then, the inked film and the print paper are feed to the position where the thermal head is provided to be performed a transfer operation. The inked film and the paper are fed simultaneously at the same speed in the same direction. That is, feeding mechanisms for the inked film and the paper are made to interlock with each other at all times.

The paper feeding mechanism is driven while the paper is inserted to the thermal printer, performed the transfer operation, and run out of the printer. That is, the paper is fed by the paper feeding mechanism from its insertion to extraction to the thermal printer. Accordingly, the paper can be set to and extracted from the printer, automatically.

However, the inked film is fed unavoidably by the inked film feeding mechanism while the transfer operation is not be carried out since the mechanism is always in mechanical contact with the paper feeding mechanism. Therefore, unused portion is left on the inked film where an ink layer is still remain on a base film. Further, even if the inked film is used for the transfer operation, there arises unused portion on the inked film where no image and character is to be printed. There may be the case where such unused portion of the inked film amounts to 50% or the more. Such wastefulness of the inked film cannot be neglected in view of the expensiveness of the inked film.

Further, in the conventional thermal printer, the inked film feeding mechanism and the thermal head are provided on a printer body, and the paper feeding mechanism and a platen roller are provided on a printer cover for covering the upper surface of the printer body. Consequently, the platen roller is located opposite to the upper surface of the thermal head.

The inked film and the paper are wound around the circumference of the platen roller about half turn. Printing operation is carried out on the circumferential surface of the platen around where the inked film and the paper are wound by the thermal head. A "center type" thermal head is employed which has a plurality of heating elements arrayed in a shallow groove at the central portion.

However, since the paper is wound around the platen roller, the printer cannot print the image and characters on a stiff thick paper. To this end, if the printer is constructed such that the paper is to be fed flatly, the paper may be fed with its printed surface downward, and thus, printed characters are not visible instantly. Further, since the thermal head is provided with its transfer surface facing upward, dust is easy to stick on the heating element so as to make the printing quality poor.

On the other hand, this type of printer has an internal memory for storing character patterns corresponding to the character codes so as to print the characters instructed by a host device. Besides, a multitude of fonts are present for each character, such as italic type, print hand type, and the like. However, it is impossible to store all the fonts in the internal memory because it requires a vast memory capacity and brings problems in mounting and price.

Thus, it is proposed that framing the memory for character patterns to a cassette ready for replacing by operators,in which character patterns for one font are stored in one cassette. Then, characters of many types of fonts can be printed on one printer by replacing the cassette. Further, since the operator may prepare the memory cassettes only the necessary font to use, substantial memory capacity can be minimized in the printer.

A conventional structure for detaching the memory cassette in this type to the dot printer is shown in FIG. 1. A connector 2 is provided on a external surface of a printer 1 for engaging a connector 4 projecting from a memory cassette 3. The memory cassette 3 is prepared in variety to cope with each font, and thus, the printer 1 is capable of printing a variety of fonts by replacing the memory cassette 3.

The connector 4 of the memory cassette 3 has a plurality of terminals for address bus, data bus, power supply and earth. These terminals come in contact with reception terminals of the connector 2 to supply character patterns with the printer 1. Reversaly, the printer 1 supplies electrical power with the Read Only Memory (ROM) in the memory cassette 3 via one of the terminals. The printer 1 sends character codes to the memory cassette 3 via the terminals for address while the memory cassette 3 sends instructed character patterns to the printer 1 through the terminals for data.

In this apparatus, a voltage is always applied to the power terminal of the connector 2 even when the memory cassette 3 is not installed. Accordingly, a voltage is suddenly supplied to the power terminal of the connector 4 when the memory cassette 3 is inserted, and thus, a large current flows in ROM in the memory cassette 3 to break down contents of the memory. Particularly, the memory break is often occurred when the power is supplied before earth terminals of the connector come in contact completely with each other.

To cope with such defection, it can be considered that making a main power supply of the printer 1 be cut off when the memory cassette 3 is replaced. However, in this case, contents of another internal memory (voltatile memory for storing a job program, or the like) of the printer 1 is erased at the same time, thereby, an extra operational would be required for restoration.

SUMMARY OF THE INVENTION

Accordingly, an object of the present invention is to provide a thermal printer capable of reducing an unused portion of an inked film.

Another object of the present invention is to provide a thermal printer permitting capable of printing to thick paper.

Another object of the present invention is to provide a thermal printer superior in an instant visibility of printed characters.

Another object of the present invention is to provide a thermal printer wherein dust is hard to stick on a heating element of a thermal head.

A further object of the present invention is to provide a thermal printer having a power supply mechanism for memory cassette which is capable of preventing a breakdown of memory contents at the time of replacement without cutting off a main power of a printer.

According to the present invention, a thermal printer for transferring ink of an inked film onto paper by a thermal head in accordance with images or characters to be printed, comprises a film feeding mechanism for feeding the inked film, a paper feeding mechanism for feeding the paper, a platen opposite to the head, a platen roller operating mechanism capable of changing a space of the transfer zone between the thermal head and the platen, and a control mechanism for controlling the inked film feeding mechanism in response to the platen roller operating mechanism so as to stop a feed of the inked film when the transfer zone space is enlarged.

Further, the thermal printer comprises a printer body and a closing cover on the top thereof. The closing cover includes a film feeding mechanism for feeding the inked film and a thermal head, and the printer body includes a platen opposite to the thermal head, paper feeding mechanism for feeding the paper, and a mechanism for interlocking the film feeding mechanism and the paper feeding mechanism.

Further, according to the present invention, the thermal printer has a power supply mechanism comprising a switch means for turning on/off of power supply to a memory cassette according to the distance between the memory cassette and the printer body.

BRIEF DESCRIPTION OF THE DRAWING

The above-mentioned and other objects, features and advantages of the present invention will be better understood from the following detailed description of a preferred embodiment of the present invention taken in conjunction with the accompanying drawing, wherein:

FIG. 15 is a circuit diagram of the power supply mechanism shown in FIG. 13;

FIG. 16 shows the operation of the power supply mechanism shown in FIG. 13;

FIG. 17 and FIG. 18 are perspective and sectional views of a second embodiment of a power supply mechanism to a memory cassette employed in the thermal printer shown in FIG. 2(*a*);

FIG. 19 is a circuit diagram of the power supply mechanism shown in FIG. 13;

FIG. 20 shows the operation of the power supply mechanism shown in FIG. 13;

FIG. 21 is a block diagram of the thermal printer shown in FIG. 2(*a*).

DESCRIPTION OF THE PREFERRED EMBODIMENT

Figure 1:
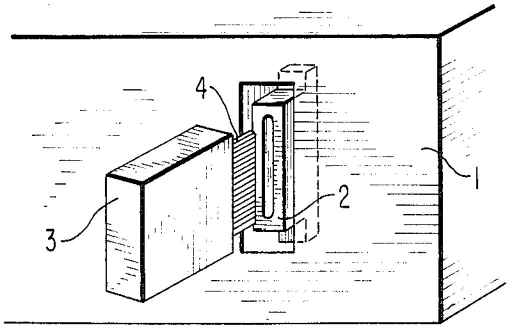
FIG 1 PRIOR ART
FIG. 1 is a perspective view showing a mounting structure of a conventional memory cassette.
Figure 2A:
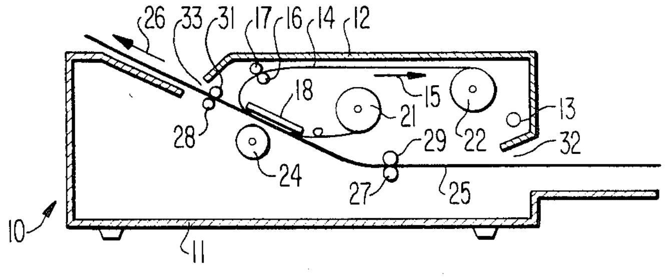
FIGS. 2(*a*) and 2(*b*) are sectional views of a thermal printer according to an embodiment of the present invention.
Figure 2B:
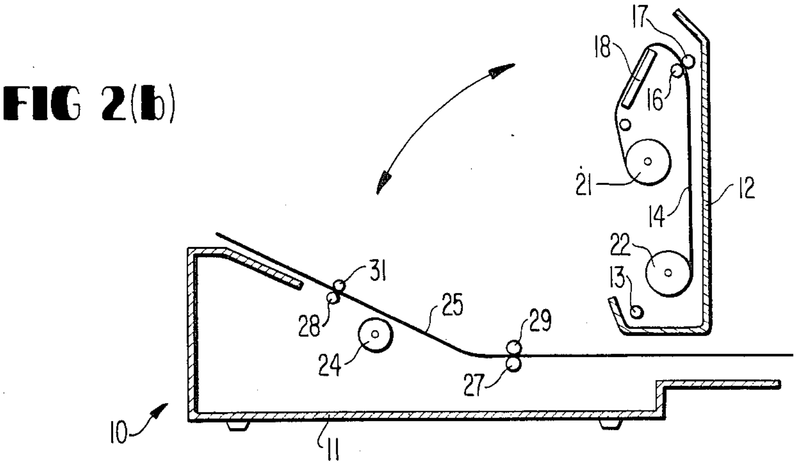

Referring to FIGS. 2(*a*) and 2(*b*) a thermal printer 10 according a preferred embodiment of the present invention comprises a printer body 11 and a cover 12 provided thereon. The cover 12 is mounted rotatably around a pivot 13 to cover the upper surface of the body 11. FIG. 2(*a*) shows a state in which the cover 12 is closed, while FIG. 2(*b*) shows a state in which the cover 12 is opened.

A film feed roller 16 and a pinch roller 17 feed an inked film 14 in the direction indicated by an arrow 15. The feed roller 16, the pinch roller 17 and a thermal head 18 are provided inside the cover 12. The inked film 14, which has an ink layer of several microns thick formed on the surface of a base film, is drawn out of a feed reel 21, and then, taken up on a take-up reel 22.

Figures 3, 4:
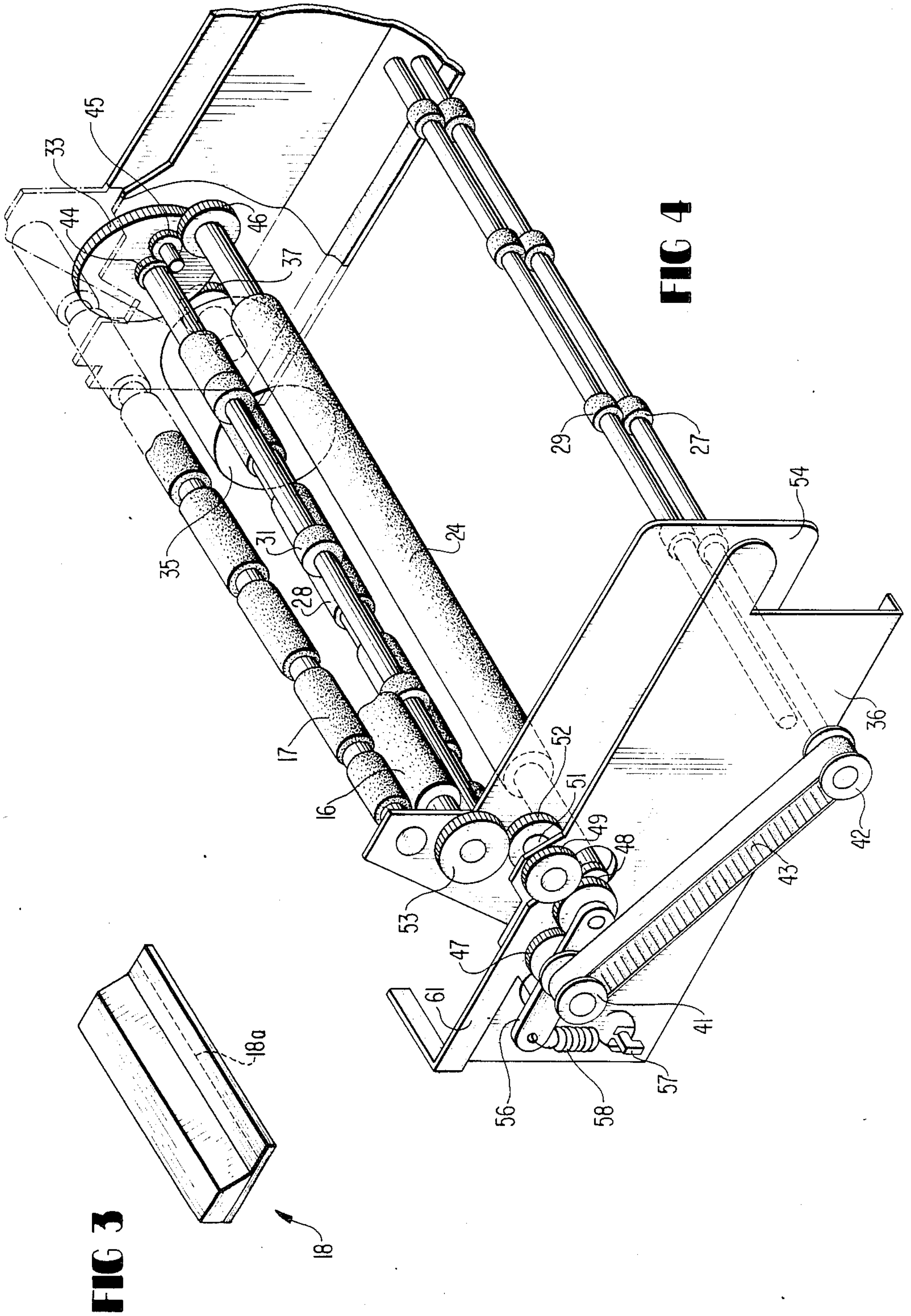
FIG. 3 is a perspective view showing a structure of a thermal head employed in the thermal printer shown in FIG. 2(*a*)
FIG. 4 and FIG. 5 are perspective views of an internal structure of the thermal printer shown in FIG. 2(*a*)

What is called "edge type" head is used as the thermal head 18. As shown in FIG. 3, the edge type thermal head 18 has a plurality of heating elements 18*a* linearly aligned on the edge portion of the structure. The operation of the edge type thermal head 18 is similar to a center type thermal head in principle.

Referring to FIGS. 2(*a*) and 2(*b*) again, the printer body 11 is provided with a platen roller 24 opposite to the thermal head 18, paper feed rollers 27 and 28 for feeding a paper 25 in the direction indicated by an arrow 26, and pinch rollers 29 and 31 opposite to the feed roller 27 and 28.

The paper 25 is inserted to the printer 10 from an inlet 32 and fed to a transfer zone located between the thermal head 18 and the platen roller 24 by the feed roller 27 and the pinch roller 29. The ink film 14 and the paper 25 are piled together to held between the thermal head 18 and the platen roller 24. Thus, an ink of the inked film 14 is transferred to print the paper 25 by the heating elements of the thermal head 18. The paper 25 after printing is extracted from an outlet 33 as indicated by the arrow 26 by the feed roller 28 and the pinch roller 31.

The feed rollers 16, 27 and 28 and the platen roller 24 are interlocked with each other and also driven by one motor 35 as shown in FIG. 4.

With reference to FIG. 4, the motor 35 is mounted on a body frame 36. The paper feed roller 28 on the outlet side is rotated by the motor 35 through gears 37 and 38. The rotation of the feed roller 28 is further transmitted to the paper feed roller 27 on the inlet side through two pulleys 41 and 42 and a timing belt 43. Further, the rotation of the feed roller 28 is transmitted to the platen roller 24 through gears 44, 45 and 46. Further, the rotation of the feed roller 28 is also transmitted to a rotating shaft 51 located on an upper portion of the body frame 36. A rotation of the rotating shaft 51 is transmitted to the film feed roller 16 supported rotatably on a cover frame 54 through gears 52 and 53. The feed rollers 16, 27 and 28 and the platen roller 24 are thus rotated and driven concurrently by one motor 35.

Figure 5:
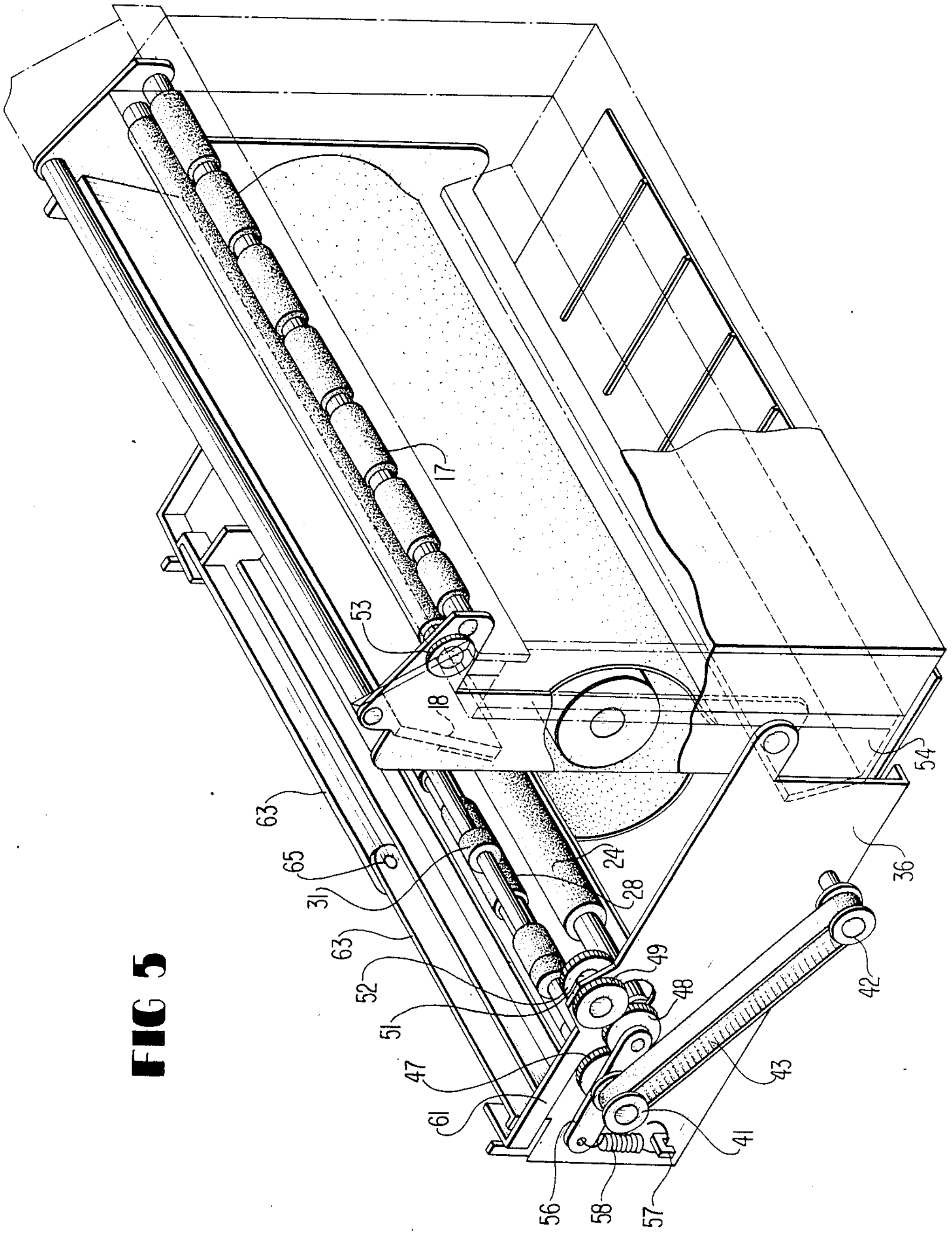

When the cover 12 is opened as shown in FIG. 2(*b*), a cover frame 54 rotates around the pivot 13 as shown in FIG. 5, and thus the gears 52 and 53 are disengaged. That is, the film feed roller 16 is driven by the motor 35 only when the cover 12 is closed. Here, it is desirable that the tip teeth of the gears 52 and 53 is formed narrower so that the gears 52 and 53 are engaged securely when the cover 12 is closed.

An idle gear 48 is provided near the gear 47 mounted on the shaft of paper feed roller 28 and the gear 49 mounted on the rotating shaft 51. The idle gear 48 is supported rotatably on one end of an idle lever 56. The idle lever 56 is mounted rotatably on the shaft of the paper feed roller 28. Accordingly, the gear 48 can be engaged or disengaged both the gears 47 and 49 by turning the idle lever 56. When the idle gear 48 is disengaged from the gears 47 and 49, a turning force to the film feed roller 16 is not transferred. The idle lever 56 is urged by a tension spring 58 so as to enable the gear 48 to engage the gears 47 and 49. The tension spring 58 is provided between the other end of the lever 56 and a spring shoe 57 of the body frame 36.

Referring further to FIG. 4 through FIG. 9, platen levers 61 are provided on both sides of the body frame 36. The platen levers 61 are supported rotatably around the shaft of paper feed roller 28. The shaft of the platen roller 24 is supported rotatably on one end of the platen levers 61. Thus, the platen roller 24 can be movable vertically as facing on the lower (transfer) surface of the thermal head 18. A tension spring 62 is interposed between the platen lever 61 and the body frame 36. The tension spring 62 holds up the platen roller 24 toward the thermal head 18.

First end of the platen lever 61 engages the shaft of the platen roller 24. When a second end of the platen lever 61 is held up to rotate it around the shaft of the feed roller 28, the idle lever 56 is also turned clockwise in FIG. 4. That is, when the platen lever 61 is turned clockwise, the platen roller 24 is detached from the thermal head 18 as well as the idle gear 48 is disengaged from the gears 47 and 49. Thereby, a power transmission to the film feed roller 16 is stopped.

Figure 6:
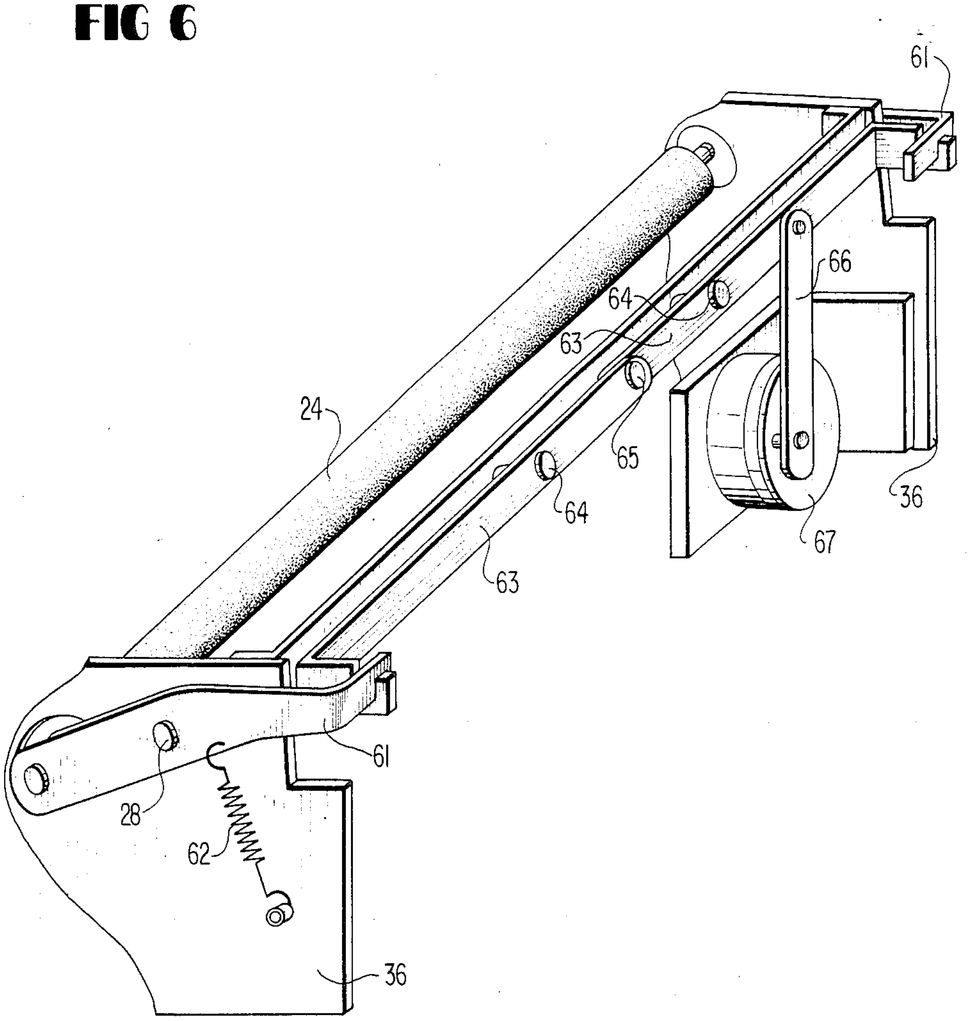
FIG. 6 is a perspective view of a first embodiment of a platen roller operating mechanism employed in the thermal printer shown in FIG. 2(*a*)
Figure 7:
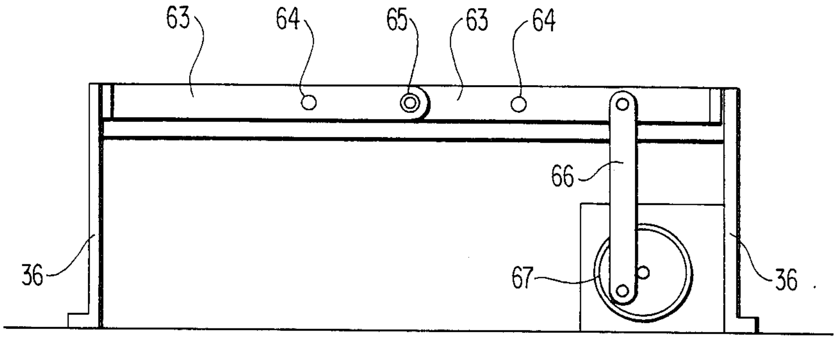
FIG. 7 and FIG. 8 are front views showing an operation of the platen roller operating mechanism shown in FIG. 6.
Figure 8:
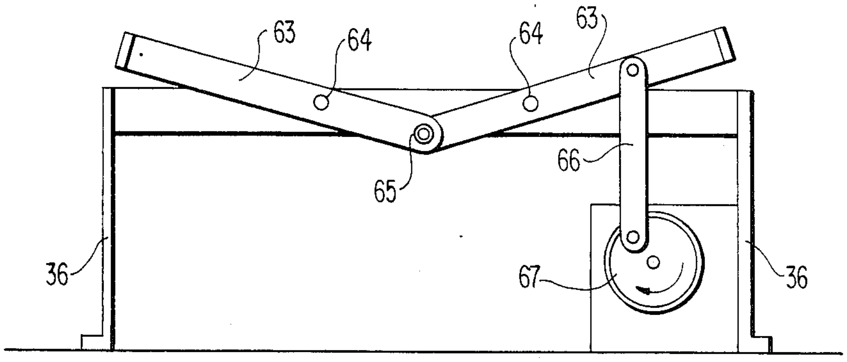

The second end of the platen lever 61 engages a pair of arms 63. As shown in FIG. 6, each of the arms 63 is rotatably mounted on the body frame 36 via supporting member 64. Further, the arms 63 is rotatably connected each other by a pin 65. A rotary solenoid 67 is connected to the one of the arms 63 through a rod 66. The arms 63 are kept in horizontal as shown in FIG. 7 when the rotary solenoid 67 is not driven. When the solenoid 67 is driven, a driving force is transmitted to one of the arms 63 through the rod 66, both the arms 63 rotate around the supporting members 64 to lift up end portions engaging the platen lever 61 as shown in FIG. 8.

Figure 9:
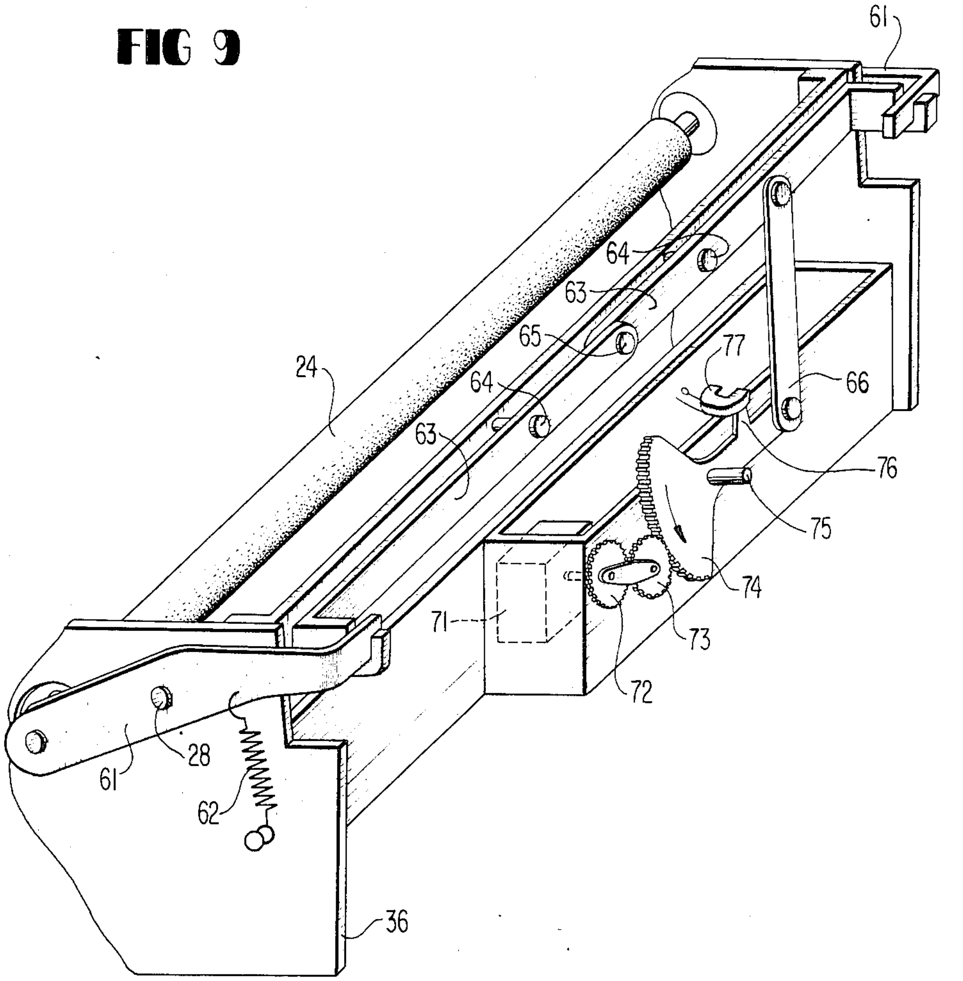
FIG. 9 is a perspective view of a second embodiment of the platen roller operating mechanism employed in the thermal printer shown in FIG. 2(*a*)

To lift up one end of the platen lever 61, a mechanism shown in FIG. 9 can also be employed. In FIG. 9, a stepping motor 71 is provided as driving means for the arms 63. Rotation of a stepping motor 71 is transferred to a segment gear 74 through gears 72 and 73. The segment gear 74 is rotatably supported to the frame 36 by a supporting member 75. A rod 66 connects the one of the arms 63 and the segment gear 74. When the motor 71 is actuated, the segment gear 74 rotates in the counter-clockwise direction in FIG. 9, thereby, the end portions engaging the platen lever 61 is lifted up. To detect the rotational position of the segment gear 74, an optical sensor 77 is provided on the frame 36 to sense a detecting piece 76 formed on the segment gear 74.

Figure 10:
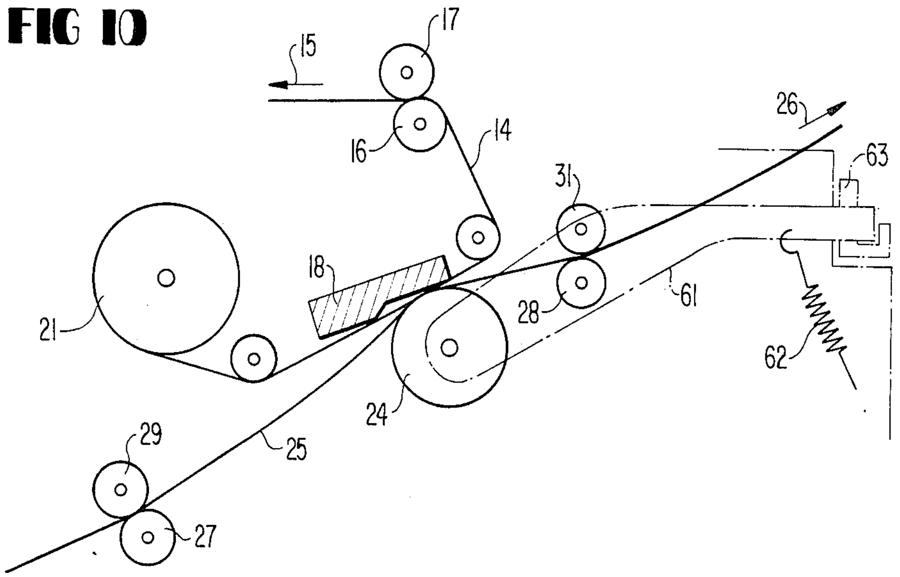
FIG. 10 is a side view showing an operation of the thermal printer shown in FIG. 2(*a*) when the platen roller operating mechanism is not actuated.

As shown in FIG. 10, driving means for the arms 63 is not actuated in the printing mode. The platen lever 61 is turned clockwise around the shaft of the feed roller 28 by the tension spring 62. The platen roller 24 is pressed onto the thermal head 18 as well as the idle gear 48 is connected to the gears 47 and 49. The film feed roller 16 is driven by the motor 35 via the gears 37 and 38, the shaft of the roller 28 and the gears 47, 48, 49, 52 and 53. Accordingly, the inked film 14 is fed together with the paper 25 in the same speed to the paper 25. That is, the paper 25 and the inked film 14 piled to the paper 25 are fed through the portion between the thermal head 18 and the platen roller 24 to print an image or characters on the paper 25.

Figure 11:
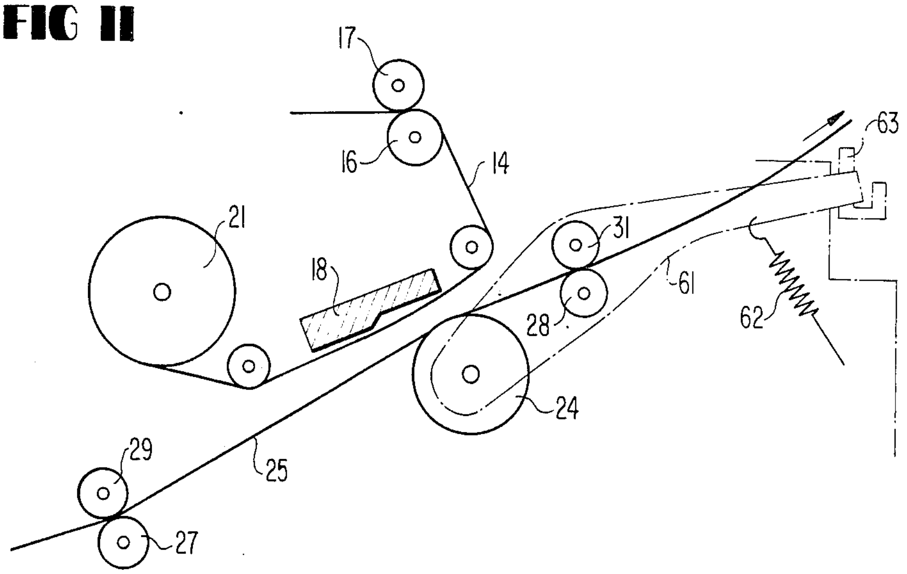
FIG. 11 is a side view showing an operation of the thermal printer shown in FIG. 2(*a*) when the platen roller operating mechanism is actuated.

When the paper 25 is inserted or extracted to the printer 10, the driving means for the arms 63 is actuated as shown in FIG. 11. The platen lever 61 is turned counter-clockwise around the shaft of the roller 28 by the arms 63. The platen roller 24 is released from the thermal head 18 as well as the idle gear 48 is disengaged from the gears 47 and 49 to stop the film feed roller 16. Thus, the paper 25 is detached from the inked film 14. Accordingly, only the paper 25 is fed to be located in a predetermined position or extracted out of the printer without feeding the inked film 14.

Further, the driving means for the arms 63 is actuated when no image or no character is to be printed in the line direction on the paper 25. The inked film 14 is not fed in this case so as to form a blank portion lateraly extending on the paper 25.

As described above, since the thermal printer can feed only the paper 25 with stopping the inked film 14, the paper 25 can be automatically inserted to and extracted from the printer 10 without wasting the inked film 14, and hence, the inked film 14 can be efficiently used.

Further, since the paper 25 is fed flatly without winding around the platen roller 24, the printer 10 can print the image or characters on a thick paper such as postcard or the like. Further, the paper 25 is extracted from the printer 10 with its printed surface upward. Therefore, the printed image and characters can be observed instantly. Furthermore, the thermal head is provided with its thermal elements downward to obtain a high print quality without being deteriorated by dust.

Next, a replacing mechanism for a memory cassette storing character patterns will be described.

Figure 12:
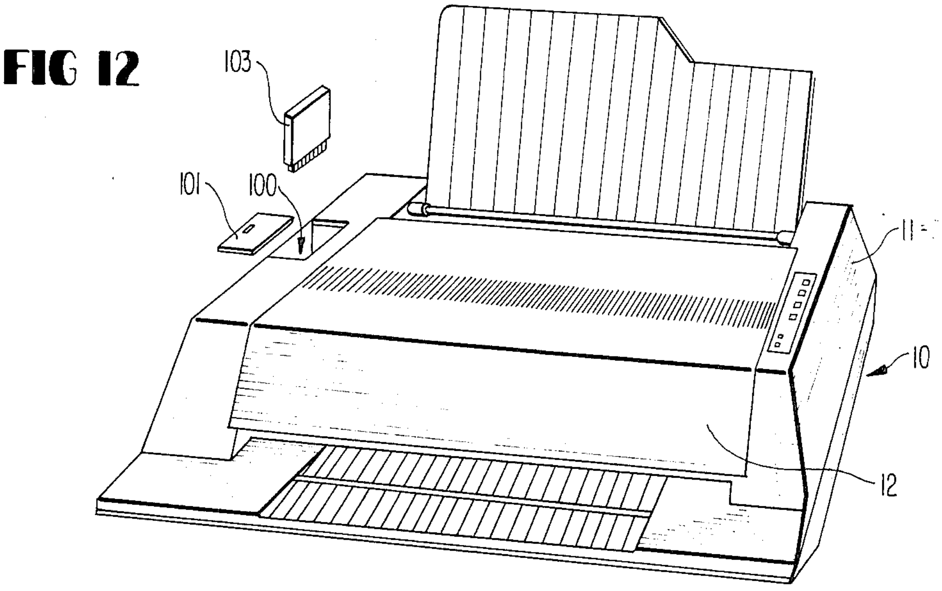
FIG. 12 is a perspective view showing an outer appearance of the thermal printer shown in FIG. 2(*a*)

Referring to FIG. 12, the thermal printer 10 has an enclosing portion 100 for a memory cassette 103 on its upper surface. A cover 101 is provided to close the openning of the enclosing portion 100. A female connector 102 is provided within the enclosing portion 100 to be connected to the memory cassette 103.

Figure 13:
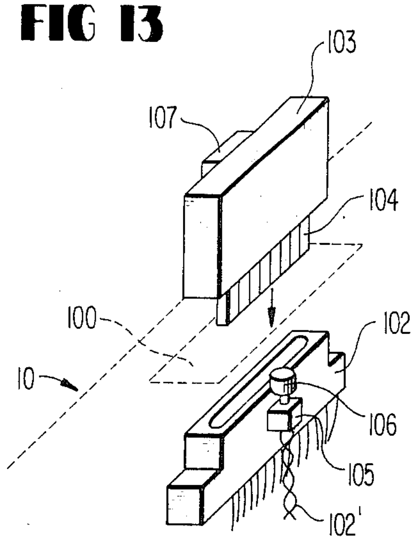
FIG. 13 and FIG. 14 are perspective and sectional views of a first embodiment of a power supply mechanism to a memory cassette employed in the thermal printer shown in FIG. 2(*a*)
Figure 14:
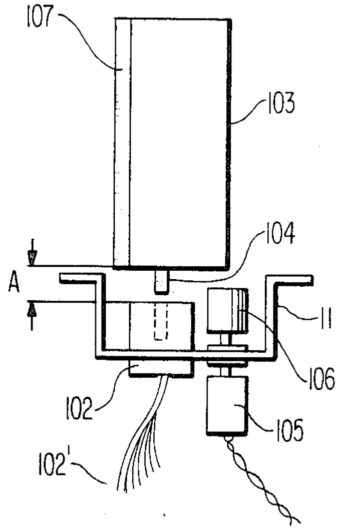

With reference to FIGS. 13 and 14, a flat cable 102' is connected to the connector 102 for exchanging various signals with the printer 10 and also supplying a power thereto. A push-button switch 105 is fixed to a side of the connector 102. The push-button 105 is fixed with its moving head 106 positioned slightly ahead of the tip of a connector 104. That is, the switch 105 is provided at a position operated by the end surface of the insertion side of the memory cassette 103, which is turned on when the cassette 103 is inserted in the connector 102 and turned off when the cassette 103 is removed from the connector 102. Then, a belt-like projection 107 on a side of the memory cassette 103 is provided so as to prevent the memory cassette 103 from being installed upside down.

With reference further to FIG. 15, the switch 105 is connected to the base of a transistor Tr through two invertors $I_1$, $I_2$ and a resistance $R_1$. A supply voltage S to be supplied to the memory cassette 103 is connected to an emitter of the transistor Tr. The transistor Tr feeds the supply voltage S to a power terminal 108 of the connector 102 connected to a collector according to change of a base voltage. A resistance $R_2$ is provided to operate the invertors $I_1$ and $I_2$, and a resistance $R_3$is provided for pulling up the transistor Tr. Further, the invertors $I_1$ and $I_2$ are provided for preventing a chattering of the switch 105.

When the switch 105 becomes on, a switching voltage is impressed on the base of the transistor Tr, and the supply voltage S is impressed on the power terminal 108 of the connector 102. Then, the switch 105 becomes off, the transistor Tr is turned off, and hence, the supply voltage S is not impressed on the power terminal 108.

Next, the relationship between a position of the memory cassette 103 with respect to the connector 102 and an operation of the switch 105 will be described with reference further to FIG. 16.

An interval A should be considered between an upper surface of the connector 102 and an inserted surface of the memory cassette 102. The interval A is 10 mm or over, each of the terminals of the connectors 102 and 104 is kept non-contacted (OFF). The moving head 106 is not depressed, therefore, a voltage is not impressed on the power terminal 108 through the connector 102.

When the cassette 103 is further inserted to the connector 102 and thus the interval A becomes 4 to 9 mm, the connectors 102 and 104 are unstable but kept contacted (ON). However, the switch 105 is still off with the moving head 106 slightly depressed. Accordingly, the supply voltage S is not fed to the power terminal 108 of the connector 102 and the memory cassette 103.

In the state where the cassette 103 is completely inserted in the connector 102, the interval A becomes 3 mm or below. In such state each terminal of the connectors 102 and 104 comes in contact stably. The switch 105 is depressed by the inserted surface of the cassette 103, and thus, becomes on. The supply voltage S is then impressed on the power terminal 108 through the flat cable 102' to be fed to the memory cassette 103 as operating voltage. In such state, each of the terminals of the connectors 102 and 104 including the earth terminal comes in contact stably, a large current will not flow to ROM in the memory cassette 103 with the result that the contents of the memory cassette 103 is not destroyed.

The above operating order is reversed when the memory cassette 103 is released from the connector 102. That is, when the interval A becomes 5 to 9 mm, the operating voltage S to the memory cassette 103 is stopped under the state where each of the terminals of the connectors 102 and 104 is in contact stably. Next, when the interval A becomes 10 mm or over, each terminal is released and the memory cassette 103 is demounted from the connector 102.

As described above, the operating power to the memory cassette 103 is operated under the state where each of the terminals of the connectors is stable in contact. Therefore, stored contents of the memory cassette 103 will be prevented from destruction when the memory cassette is attached or released.

The second embodiment of a power supply mechanism will be described next with reference to FIG. 17 to FIG. 20.

In FIG. 17 and FIG. 18, a connector 104' of a memory cassette 103' has a notch 109 at the central portion. A switch terminal 110 for the memory cassette 103' is provided on the portion of the notch 109. The terminal 110 and an adjacent terminal 111 are short-circuited in the cassette 103'. When the connector 104' is completely inserted in the connector 102, corresponding terminals 112 and 113 in the connector 102 are short-circuited to start the power supply. The terminals 110 and 112 are brought into contact after other terminals come in contact stably.

As shown in FIG. 19, an electric circuit is substantially the same to the circuit of FIG. 15 except that the operation of the switch 15 is replaced by the contact and removement of the terminals 110 and 112. However, since the switching operation is done by the terminals 110, 111, 112 and 113, it is necessary to increase the number of terminals of the connectors 102 and 104'. Referring to FIG. 20, an interval B between an upper surface of the connector 102 and an inserted surface of the cassette 103' is 10 mm or over, all of the terminals of the connector 104' do not come in contact with the terminals of the connector 102. A voltages is not impressed on the power terminal 108. When the cassette 103' is inserted to the connector 102, namely, the interval B is 5 to 9 mm, all of the terminals excepting the switch terminal 110 are brought into contact with the terminals of the connector 102. However, only the terminal 110 still detaches the terminal 112. Accordingly, the supply voltages is not supplied to the memory cassette 103' via the power terminal 108.

When the cassette 103' is completely joined to the connector 102, the interval B becomes 4 mm or below. The terminals 110 and 112 then come in contact with each other, so as to make the terminals 112 and 113 of the connector 102 be short-circuited. Thus a voltage is impressed on the base of the transistor Tr, and the voltage S from the printer 10 is impressed on the terminal 108. That is, the operating voltage S is fed to ROM in the memory cassette 103' under the state where all of the terminals of the connectors 102 and 104' is kept in contact stably.

Next, an electrical block diagram of a thermal printer 10 will be described with reference to FIG. 21.

The thermal printer 10 is controlled by a master processor 121 and a slave processor 122. The master processor 121 receives printing data from a host unit through an interface 123 and an I/O controller 124. The printing data is edited in Random Access Memory (RAM) 126 according to the program stored in ROM 125. The edited printing data is transformed into a character pattern with reference to the memory cassette 103 and sent to the slave processor 122. An I/O controller 124 is connected to a sensor for detecting paper width and paper end and a switch 127 for changing online/offline and feeding paper manually. The I/O controller 124 sends the each state to the master processor 121. Further, the I/O controller 124 flickers a display element 128 for displaying ready-for-receiving state of the printer 10, paper end state and others.

The printing data transformed into a character pattern is loaded in RAM 129 accessible by the slave processor 122. The slave processor 122 controls a mechanical controller 131 according to a program loaded in ROM 130 and drives a driver 132 according to a data loaded in RAM 129. That is, the driver 132 drives selectively the thermal head 18, the motor 35 for feeding the paper 25 and inked film 14 and the rotary selenoid 67 according to a control of the controller 131.

As described above, the printing data from the host unit can be printed in a character pattern according to contents of the memory cassette 103.

What is claimed is:

1. A thermal printer for transferring ink of an inked fil onto paper by a thermal head in accordance with images or characters to be printed when the thermal head is brought to a platen, comprising a platen opposite to said thermal head to form a transfer portion therebetween where said ink is transferred to said paper, a inked film feeding mechanism for feeding said inked film through an inked film path including said transfer portion, a paper feeding mechansim for feeding said paper through a paper path including said transfer portion, a release mechanism for releasing said thermal head from said platen, and control means in response to said release mechanism for disenabling said inked film feeding mechanism to stop feeding said inked film and at the same time enabling said paper feeding mechanism to feed said paper when said thermal head is released from said platen by said release mechanism whereby only said paper is fed through said transfer portion while feeding of said inked film is stopped.

2. The thermal printer as claimed in claim 1, wherein said control means comprises transmission means movable together with said release mechanism and engagable with said paper feeding mechanism and said inked film feeding mechanism, said transmission means transmitting the drive force of said paper feeding mechanism to said inked film feeding mechanism when said thermal head is engaged with said platen and ceasing to transmit said drive force to said inked film feeding mechanism when said thermal head is released from said platen.

3. The thermal printer as claimed in claim 1, wherein said release mechanism comprises a platen lever for supporting one end of said platen, said platen lever being rotatably provided around a rotary axis to locate said platen in a contact position and a release position, and lever drive means for rotating said platen lever around said rotary axis.

4. A thermal printer comprising:

a thermal head including a plurality of heater elements actuated in accordance with image or characters to be printed;

a platen located opposite to said heater elements of said thermal head;

a platen lever for supporting said platen in a first position where said platen is urged to said thermal head and a second position where said platen is released from said thermal head;

a paper feeding mechanism for feeding paper between said thermal head and said platen, said paper feeding mechanism being connected to a drive motor to receive a drive force thereof;

an inked film feeding mechanism for feeding an inked film between said thermal head and said platen' and a transmission mechanism coupled to said platen lever and said paper feeding mechanism for transmitting said drive force of said paper feeding mechanism to said inked film feeding mechanism when said platen lever supports said platen in said first position and for separating said drive force from said inked film feeding mechanism when said platen lever supports and platen in said second position whereby only said paper is fed between said thermal head and said platen while feeding of said inked film is stopped.

5. A thermal printer comprising:

a thermal head including a plurality of heater elements arrayed in its longitudinal direction;

a platen roller provided opposite to said heater elements of said thermal head;

a paper feeding shaft provided with a paper feed roller for feeding paper between said platen roller and said thermal head, said paper feeding shaft being provided at a first end with a driven gear connected to a drive motor to receive a rotary force therefrom and a drive gear at a second end;

platen levers for supporting both longitudinal ends of said platen roller, said platen levers rotatably provided around said second end of said paper feeding shaft;

a platen lever drive means for rotating said platen lever so that said platen levers are located in a first position where said platen is urged to said thermal head and a second position where said platen is released from said thermal head;

an inked feeding shaft provided with a inked film feed roller for feeding an inked film between said thermal head and said platen roller, said inked film feeding shaft being provided with a driven gear; and an idle lever rotatably provided around said second end of said paper feeding shaft and connected to said platen lever to rotate together with said platen lever, said idle lever having an idle gear at one end so that said idle gear engages said drive gear of said paper feeding shaft and said driven gear of said inked film feeding shaft, when said platen lever takes said first position, to transmit a rotary force of said paper feeding shaft to said inked film feeding shaft, and that said idle gear separates from said driven gear of said inked film feeding shaft, when said platen lever takes said second position, to stop the feeding of only said inked film.

6. The thermal printer as claimed in claim 1, further comprising a printer body having a opening on its upper surface, a closing cover provided on said printer body to cover said opening, and an interlocking mechanism for interlocking said film feeding mechanism and said paper feeding mechanism, said film feeding mechanism and said thermal head being incorporated in said closing cover, and said platen and the form paper feeding mechanism being incorporated in said printer body.

7. The thermal printer as claimed in claim 1, wherein said interlocking mechanism engages said film feeding mechansim with said paper feeding mechanism when said closing cover is closed and disengages the film feeding mechanism from said paper feeding mechanism when said closing cover is opened.

* * * * *

UNITED STATES PATENT AND TRADEMARK OFFICE
CERTIFICATE OF CORRECTION

PATENT NO. : 4,689,639

DATED : August 25, 1987

INVENTOR(S) : KIMURA ET AL

It is certified that error appears in the above-identified patent and that said Letters Patent is hereby corrected as shown below:

COLUMN 1, LINE 16 Delete "feed" and insert --fed--

COLUMN 9, LINE 11 Delete "fil" and insert --film--

COLUMN 9, LINE 14 After "platen" insert --disposed--

COLUMN 9, LINE 49 Delete "image" and insert --images--

COLUMN 9, LINE 62 Delete "platen'" and insert --platen;--

COLUMN 10, LINE 31 After first occurrence of "inked" insert --film--

Signed and Sealed this

Sixteenth Day of August, 1988

*Attest:*

DONALD J. QUIGG

*Attesting Officer*

*Commissioner of Patents and Trademarks*